United States Patent [19]

Maher

[11] Patent Number: 4,968,332
[45] Date of Patent: Nov. 6, 1990

[54] SEPARATOR UNIT

[76] Inventor: Thomas P. Maher, R.D. #1, Box 61 U.S. Rte. 22, New Allexandria, Pa. 15670

[21] Appl. No.: 348,876
[22] Filed: May 8, 1989
[51] Int. Cl.$^5$ .............................................. B01D 19/00
[52] U.S. Cl. ...................................... 55/172; 55/185; 55/385.4
[58] Field of Search ................ 55/183, 184, 185, 186, 55/385.4, 385.1, 337, 171, 172; 166/267; 220/88 A, 370, 372

[56] References Cited

U.S. PATENT DOCUMENTS

| | | | |
|---|---|---|---|
| 1,159,831 | 11/1915 | Cunningham | 220/88 A |
| 1,266,665 | 5/1918 | Davis | 220/88 A |
| 2,976,950 | 3/1961 | Smith | 55/385.1 |
| 3,710,556 | 1/1973 | Barratt et al. | 55/456 |
| 4,385,912 | 5/1983 | Parrick et al. | 55/184 |

FOREIGN PATENT DOCUMENTS 493645 3/1930 Fed. Rep. of Germany ........ 55/462

Primary Examiner—Charles Hart
Attorney, Agent, or Firm—Clifford A. Poff

[57] ABSTRACT

An oil storage tank separator unit to prevent the discharge into the surrounding natural environment of a high pressure, high velocity stream of oil and/or salt water during venting of a natural gas well head. The separator unit is coupled to a vent of an oil storage tank which is connected to the well head. The separator unit is comprised of a hollow shell structure for housing a flow energy dissipating system including a flow dissipating assembly in the form of discharge flow redirecting means and an aggregation of stainless steel or molded steel turnings. When a pressurized gas and liquid mixture is supplied to the oil storage tank, a portion of the pressurized mixture flows through the vent of the storage tank and into the separator unit. The flow energy dissipating system prevents the liquid from being vented to the environment while allowing the gaseous portion of the mixture to be vented. The liquid portions of the mixture thereafter fails back into the storage tank. The oil storage tank separator unit further has utility as a storage receptacle for the collection of residue produced during gas production line maintenance operations.

10 Claims, 2 Drawing Sheets

SEPARATOR UNIT

BACKGROUND OF THE INVENTION

1. Field of the Invention

The present invention relates generally to environmental protection apparatus, and, more particularly, to a separator unit for separating and containing the liquid portions of a gas/liquid mixture expelled from a gas well during blow-off procedures which expel from the well head excessive fluid blockage in the form of oil and/or salt water, such blockage reducing gas pressure at the well head and thus reducing production of the gas well.

2. Description of the Prior Art

In the normal operation of a natural gas well, once the gas is pumped out of the well, the gas is piped to a production line whereat processing of the gas commences. As a normal consequence of the pumping operations, varying amounts of oil and water occurring in the well are also pumped out of the well. In most instances, the amount of liquid pumped out of the well is not excessive and may be separated from the gas at the well head by using a relatively small volume separator tank without interrupting normal pumping operations. At certain times, however, an excessive amount of liquid is pumped out of the well. During such times, the gas pressure of the natural gas at the well head drops due to the lessened proportion of gas pumped out of the well. When this situation arises, a special procedure is required to remove the liquid from the well head. A dedicated piping apparatus, commonly referred to as a blow-off line, connects the well head to an oil storage tank. During those times in which the gas pressure at the well head is lessened, indicative of a high volume of liquid at the well head, a valve is opened to allow the liquid to flow through the blow-off line into the oil storage tank. The oil storage tank is vented so that the interior thereof is normally at atmospheric pressure while at the same time, the pressure at the well head, even at a reduced pressure, is well above atmospheric pressure. Such a pressure differential causes the gas/liquid mixture to flow through the blow-off line and into the oil storage tank at a high velocity. The volume of the oil storage tank generally can contain the volume of the liquid portion of the gas/liquid mixture expelled during blow-off if the pressure of the gas/liquid mixture is not too great. However, if the pressure becomes too excessive, a certain amount of this gas/liquid mixture will be expelled through the vents of the oil storage tank which vent the interior of the storage tank to the atmosphere. Such a discharge causes environmental contamination as well as a high level of noise.

A means for preventing this discharge into the environment would eliminate the environmental contamination caused by such discharges.

There is also a need for providing a containment vessel for holding scale, liquid and other contaminants which are removed from the insides of gas production pipelines during normal maintenance operations. As is known, in the normal maintenance of a gas production pipeline, it is common to drive a pig under pressure through the section of the pipeline to be cleaned or maintained. As it travels through the pipeline, the pig removes scale and other deposits from the interior wall of the pipeline. Also, any liquid which has collected in the pipeline is forced through the pipeline ahead of the pig as the pig travels therethrough. Over long stretches of pipeline, the volume of the collected fluid and/or scale which is forced through the pipeline may become quite significant. Thus, a need exists for providing a large volume containment vessel which may receive liquid, scale and other contaminants from a gas production pipeline during maintenance thereof.

It is therefore the object of the present invention to provide a means by which the exit of environmentally damaging discharge from an oil storage tank may be prevented during gas well blow-off operations.

It is a further object of the invention to provide a means for preventing high levels of noise from being produced during gas well head blow-off operations.

It is a further object of the invention to provide a large volume vessel which communicates with a gas pipeline for receiving liquid, scale and other contaminants removed from the pipeline during maintenance thereof.

Still other objects and advantages will become apparent when one considers the attached drawings and description of the invention presented hereinbelow.

SUMMARY OF THE PRESENT INVENTION

In accordance with the present invention, an oil storage tank separator unit is disclosed for preventing environmental contamination caused by the release of a gas/liquid mixture into the environment during removal of the gas/liquid mixture from the well head of a gas producing well. A separator unit includes a hollow shell structure having a first open end and a second open end whereby the shell structure creates an internal cavity area between the two open ends. In the preferred embodiment, the shell structure comprises a metallic cylinder. A connecting means is positioned at the first open end of the shell structure for connecting the shell structure to an opening of the oil storage tank to thereby provide a passageway between the interior of the oil storage tank and the cavity of the shell structure. The connecting means may, for example, comprise a conical shaped metallic member having a first end of dimensions similar to the first open end of the hollow shell structure to allow connection therebetween, and a second end of dimensions similar to the opening of the oil storage container to allow connection therebetween. The second end of the conical shaped member may further contain a flange to allow the connection to the oil storage container. A separator means is positioned in the cavity of the shell structure for separating the liquid portions from the gas/liquid mixture while allowing the gaseous portion of the gas/liquid mixture to exit through the second open end of the shell structure. In the preferred embodiment, the separator means is comprised of a gas/liquid mixture discharge flow directing means and an aggregation of metal turnings, such as stainless steel, or molded steel, turnings. A holding means is positioned within the hollow shell structure to hold the aggregation of metal turnings in position in the cavity of the shell structure. In the preferred embodiment, the holding means includes a first grating positioned beneath the aggregation of metal turnings and a second grating positioned above the aggregation of metal turnings to hold therebetween the aggregation of metal turnings.

DESCRIPTION OF THE PREFERRED EMBODIMENT

Figure 1:
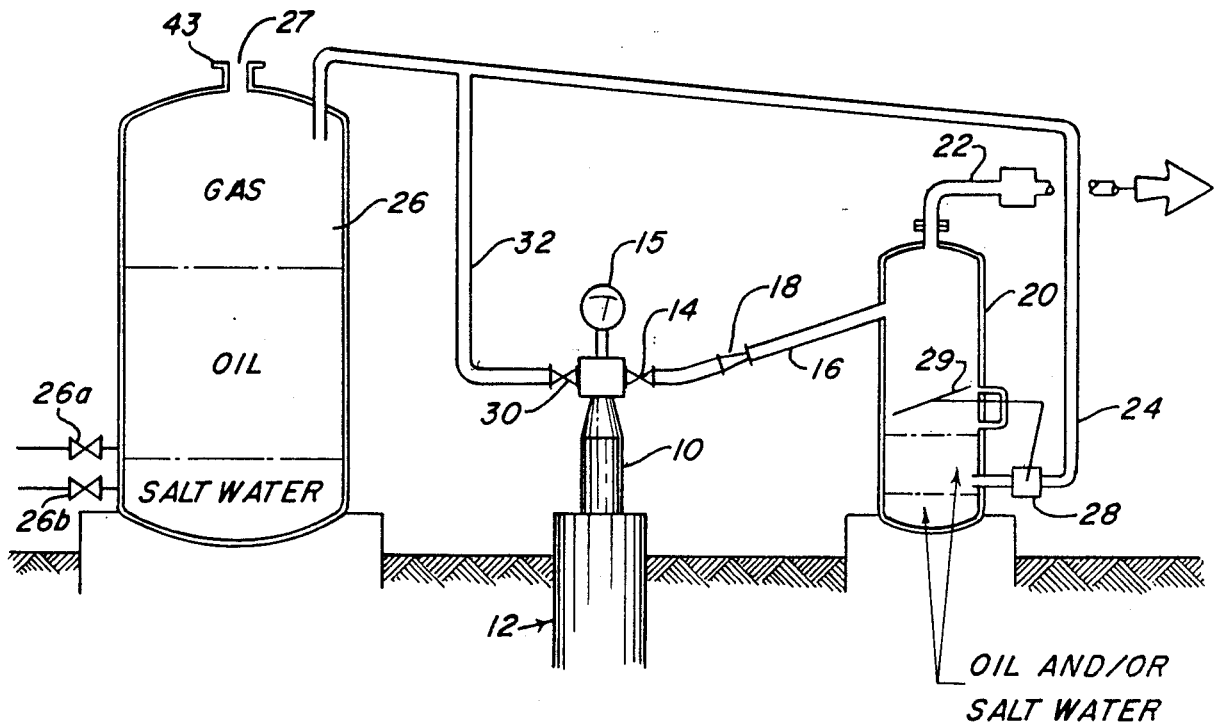
FIG. 1 is a schematic illustration of a well head of a typical prior art natural gas well and the associated connections extending therefrom.

Referring now to the schematic illustration of FIG. 1, there is illustrated a well head 10 of a natural gas well 12. During normal pumping operations, the natural gas, comprised in most part of methane and to a lesser extent, of other combustible hydrocarbons, flows out of the well 12 and into the well head 10. Also flowing out of the gas well 12 during pumping operations is a certain amount of water, usually containing a large percentage of salts dissolved therein, and other liquid, such as oil. In most instances, the proportion of liquid pumped out of the well 12 is not significant, allowing normal pumping operations to proceed unhindered. During such times, valve 14 is opened to allow the gas, as well as any liquid, to flow through pipe means 16 which also contains choke means 18. Pipe means 16 is connected to a top portion of separator tank 20. Any oil or water flowing through pipe means 16 is separated from the natural gas and falls through the separator tank 20, while the natural gas is allowed to continue through pipe means 22 to be processed in a natural gas production line (not shown). Pipe means 24 exits a bottom portion of separator tank 20 and connects with a top portion of an oil or other liquid storage tank 26. Storage tank 26 is maintained at atmospheric pressure by virtue of vent means 27 located at the top of oil storage tank 26 which communicate and vent the interior of the tank 26 with the atmosphere. When it becomes necessary to drain oil storage tank 26, drain valves 26a and 26b may be opened to drain the oil and/or salt water contained therein.

Pipe means 24 allows oil and water which has been separated from the natural gas in separator tank 20 to flow to oil storage tank 26 when valve means 28 is opened. Valve means 28 is operated by float assembly 29, causing valve means 28 to open when the liquid level of separator tank 20 exceeds a predetermined level.

Occasionally, however, during pumping operations, an abnormally high proportion of liquid is pumped out of the well 12 into well head 10. When this occurs, the gas pressure of the natural gas indicated by pressure gauge 15 at the well head 10 decreases in response to the lessened amount of gas at the well head 10. When such a decrease in gas in pressure is detected, valve means 14 is closed, thereby preventing the flow of the gas and liquid mixture to separator tank 20. After valve means 14 is closed, valve means 30 is opened to allow the gas and liquid to flow directly into oil storage tank 26 through blow-off line 32. Because the pressure at the well head 10, even at the lessened pressure due to the increased amount of liquid at the well head, is much higher than atmospheric pressure, the flow rate of the gas and liquid along blow off line 32 is very high. Upon entering the oil storage tank 26, a certain portion of this gas and liquid is expelled into the atmosphere through pressureequalizing vent means 27. The expelled liquid is an environmental contaminant.

Figure 2:
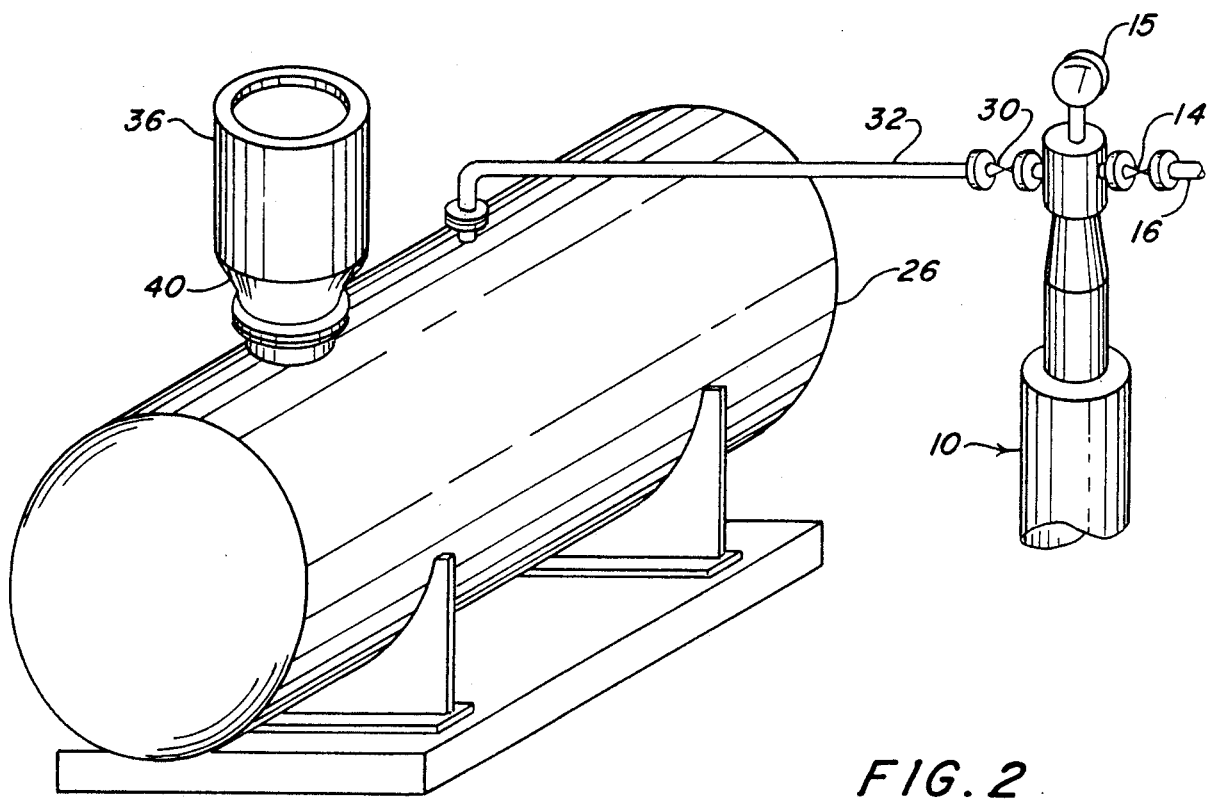
FIG. 2 is a perspective view of the separator unit of the present invention mounted atop an oil storage tank.
Figure 3:
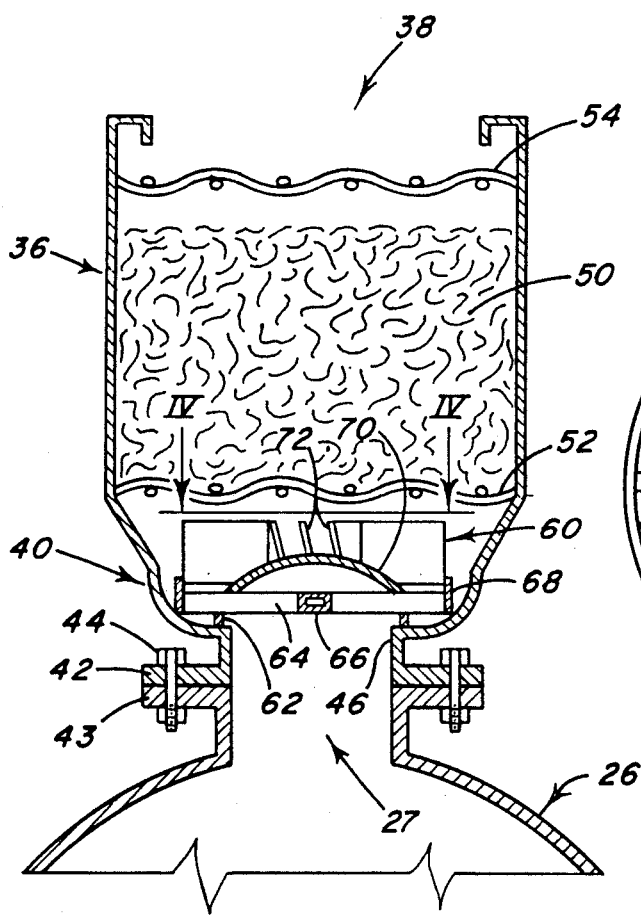
FIG. 3 is an enlarged, partial cross-sectional view of the separator unit of the present invention.
Figure 4:
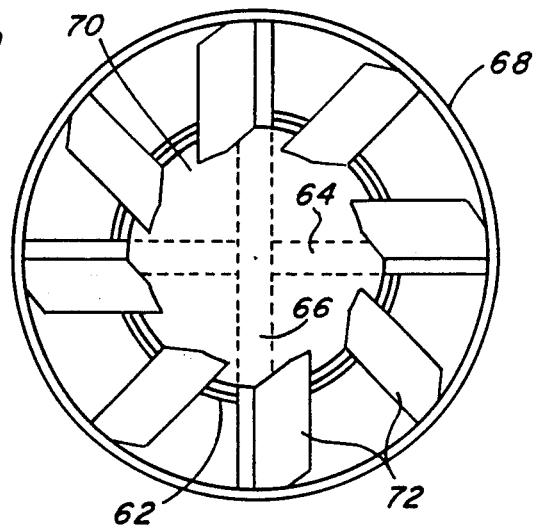
FIG. 4 is a view taken along line IV—IV of FIG. 3.

Referring now to the illustration of FIG. 2, there is illustrated the separator unit 36 of the present invention which may be attached to vent means 27 of a conventional oil storage tank 26. When the separator unit 36 is properly attached, the environmental contamination which results when an oil storage tank 26 is vented directly to the atmosphere is prevented. Separator unit 36, in the preferred embodiment, is comprised of a metal cylinder having one end 38 opened to the atmosphere and being connected at a second end thereof through a substantially conical connecting means 40 to vent means 27 of oil storage tank 26. In the preferred embodiment, connecting means 40 includes a flange 42 to connect with a flange 43 of vent means 27 of oil storage tank 26. Flanges 42 and 43 are fastened together by suitable fasteners 44, such as bolts 44 or the like. Positioned in the cavity formed in the interior of separator unit 36 is a dense aggregation of small chips or pieces of stainless steel or molded steel fragments such as turnings 50. Turnings 50 are held in position by a first metal grating 52 positioned beneath the aggregation of steel turnings 50 and a second grating 54 positioned above the aggregation of turnings 50. Gratings 52 and 54 substantially span the cross section of the cylindrical shell of the separator unit 36.

Substantially conical connecting means 40 has contained therewithin a flow energy dissipating assembly 60. Flow energy dissipating assembly 60 includes an annular support ring 62. Annular support ring 62 normally rests on an interior shoulder 46 of substantially conical connecting means 40. Welded to annular ring 62 are a pair of perpendicular bars 64 and 66. Encircling and welded to outermost ends of bars 64 and 66 is circumferential band 68. Welded atop bars 64 and 66 is a slightly arched circular plate 70; and welded to an upper convex surface of plate 70 at inner ends thereof and to circumferential band 68 at outer ends thereof are a plurality of vanes 72. Each of the vanes 72 are welded to plate 70 and band 68 such that they form an acute angle with respect to the vertical. Flow energy dissipating assembly 60 as well as turnings 50 together form a flow energy dissipating and noise reduction system which completely eliminates environmentally damaging and noisy discharges from oil storage tank 26.

Operation of the separator unit 36 in cooperation with the oil storage tank 26 is described herebelow. As noted previously, there are occasional times when excess liquid (i.e. oil and/or salt water) collect at the well head of a gas well. When this occurs, gas pressure and gas production are reduced. In order to resume normal pressure and production operating conditions, the excess liquid at the well head is removed by way of the blow-off procedure described hereinabove.

During blow-off, as the pressurized gas/liquid mixture surges into the storage tank 26 through blow-off line 32, the tank 26 serves as a large volume reservoir for receiving the pressurized gas/liquid mixture. Acting as such a reservoir, the pressure and thus the velocity of the gas/liquid mixture entering the tank 26 is reduced since the volume of the tank 26 is generally significantly greater than the volume in which the gas/liquid mixture is contained within the well head. Further augmenting this reduction in velocity and pressure of the gas/liquid mixture is that the interior of the tank 26 is vented to the atmosphere indirectly through separator 36. The reduction in pressure and velocity of the gas/liquid mixture is, of course, caused by the relatively instantaneous release of a portion of the gas from the mixture as it enters tank 26 from blow-off line 32. However, even upon a release of a portion of the gas from the mixture, the gas/liquid mixture still retains a significant level of pressure and velocity and, hence, kinetic energy as it surges through tank 26. It is this kinetic energy which is the cause of the discharge of a portion of the gas/liquid mixture through the vent means 27 of the oil storage tank 26 into separator unit 36.

The separator unit 36 of the present invention provides a means for completely dissipating the undesirable kinetic energy in the gas/liquid mixture as a portion of the mixture is discharged into the separator unit through vent means 27. As pressurized gas/liquid mixture is discharged through vent means 27 of tank 26, it first passes through the spaces between perpendicular bars 64 and 66 of flow energy dissipating assembly 60 to then impact the concave undersurface of slightly arched circular plate 70. The arch configuration of the plate 70 is so designed as to redirect the discharge flow impinging thereupon radially outwardly in all directions toward lower, radially outermost regions of substantially conical connecting means 40. This redirection of the discharge flow by plate 70 is a first step in the reduction of the kinetic energy of the discharge flow.

From the lower, radially outermost regions of conical connecting means 40, the discharge flow is redirected upwardly along the walls of the connecting means 40 toward angled vanes 72. This second redirection further reduces the kinetic energy of the flow of the gas/liquid discharge. The reduced energy discharge flow then contacts the angled surfaces of vanes 72 which redirect the discharge flow for the third time, and further reduce the kinetic energy of the discharge flow. From this point, the discharge flow is directed via the angled vanes 72 through the lower grating 52 where it is further diffused. Lastly, any upwardly directed kinetic energy remaining in the gas/liquid mixture is completely dissipated through contact with the dense aggregation of stainless or molded steel turnings 50, the dense aggregation of turnings 50 being highly resistant to liquid flow therethrough. And, the dense aggregation of turnings further acts as an effective sound muffling system.

While in the turnings 50, what gas which had remained in the gas/liquid mixture is released through the open upper end 38 of the separator 36 and the liquid portion of the mixture is left to drain by gravity back into storage tank 26.

It is also contemplated that more than one such separator unit 36 may be attached to the oil storage tank 26, if so desired.

From the foregoing, it can be readily appreciated that a separator unit constructed in accordance with the present invention is an effective means for preventing environmental damage caused by contaminant discharge from oil storage tanks associated with gas wells and for reducing noise produced by such discharges.

Figure 5:
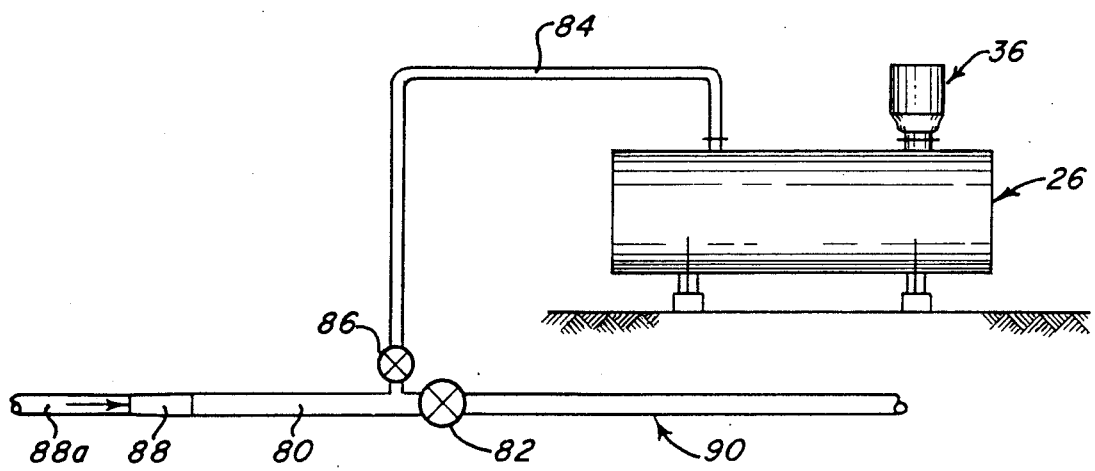
FIG. 5 is a schematic illustration of a storage tank and separator unit of the present invention used as a containment vessel for gas pipeline maintenance operations.

A further advantageous use of the oil storage tank 26 and separator unit 36 of the present invention is depicted schematically in FIG. 5. As shown in that figure, a separator unit 36 is mounted atop an oil or other liquid storage tank 26 as previously described.

A section 80 of a gas production pipeline 90 is shown which is in need of maintenance. The section 80 has a valve 82 therein which is open during normal production operations and closed during maintenance operations. Branching from section 80 is a maintenance line 84 which is connected to tank 26 similarly to the manner in which blow-off line 32 was connected to tank 26 as shown in FIGS. 1 and 2. Maintenance line 84 has a valve 86 therein which closed during normal production operations and open during maintenance operations.

During normal operations, section 80, and for that matter all of pipeline 90, becomes contaminated to some degree with scale, sludge and/or liquid contaminants which collect on the inside of the pipeline. When the mass of such contaminants becomes significant, the pipeline 90 is shut down for a cleaning maintenance operation. For purposes of illustration, only the maintenance of section 80 of pipeline 90 will be discussed in detail. However, it should be understood that such an operation is applicable to all sections of pipeline 90.

As is conventional, when cleaning a pipeline such as a gas production pipeline, a cleaning device commonly known as a "pig" is inserted into the pipeline and driven therethrough under pressure. When the pipeline section 80 of the pipeline 90 is to be maintained or cleaned, the valve 82 is closed and valve 86 is opened. A pig 88 closely fitting within pipe section 80 is inserted therein and driven under pressure in the direction arrow 88a. As it travels through the pipe section 80, which may extend tens or even hundreds of meters, the pig 88 scrapes scale and other sludge from the wall of the pipe section 80 and forces fluid collected in lowermost regions of the pipeline to be displaced ahead of the pig such that the fluid carries the scale, sludge and other contaminants through valve 86, along maintenance line 84 and into storage tank 26. Since pipeline section 80 may at times be substantial in length, the mass and volume of fluid, scale and other sludge collected therein may be quite significant. Therefore, the stage tank 26 shown in FIG. 5 should be chosen such that it can contain all of the solid and/or liquid residue removed from pipe section 80 during maintenance thereof. The separator unit 36 serves to separate and release residual gas contained within pipe section 80 which is expelled therefrom during the above-described maintenance operation.

Upon completion of the travel of pig 88 through pipeline section 80, the pig is removed from the pipeline, valve 86 is closed, valve 82 opened, and normal production resumed. Lastly, storage tank 26 can then be drained of the scale, sludge and/or liquid removed from pipeline section 80 during the maintenance operation.

As can now be appreciated, the storage tank/separator unit construction of the present invention is not only useful as a contaminant discharge prevention device but it serves equally well as a storage receptacle for the collection of residue produced during gas production line maintenance operations.

While the present invention has been described in accordance with the preferred embodiments of the various figures, it is to be understood that other similar embodiment may be used or modifications and additions may be made to the described embodiment for performing the same functions of the present invention without deviating therefrom. Therefore, the present invention should not be limited to any single embodiment but rather construed in breadth and scope in accordance with the recitation of the appended claims.

What I claim is:

1. An oil storage tank separator unit in combination with an oil storage tank for preventing environmental contamination caused by expulsion under pressure of an amount of a pressurized gas/liquid mixture sufficiently highly pressurized to spontaneously expel into the environment from a vent opening of said oil storage tank during removal of the gas/liquid mixture from a well head of a gas producing well and discharging of the gas/liquid mixture into said oil storage tank through a pipeline connected to an inlet opening of said oil storage tank, said separator unit comprising:

a hollow shell structure having a first open end and a second open end, said shell structure creating a internal cavity area between said first open end and said second open end;

means positioned at said first open end of the shell structure for connecting the shell structure to said vent opening of said oil storage tank such that a passageway is provided between the interior of the oil storage tank and the cavity of the shell structure;

means located in the cavity of the shell structure for separating the liquid from the gas/liquid mixture expelled under pressure from said vent opening of said oil storage tank to allow the gaseous portion of the gas/liquid mixture to exit through the second open end of the shell structure during said removal of the gas/liquid mixture from said well head and said discharging of the gas/liquid mixture into said oil storage tank, said means for separating comprising means for dissipating the kinetic energy of the gas/liquid mixture, said means for dissipating the kinetic energy of the gas/liquid mixture including means for changing the direction of flow of the gas/liquid mixture passed through said passageway, said means for changing the direction of flow comprising vane means, whereby said amount of the gas/liquid mixture is caused, through kinetic energy provided by the pressure of the gaseous portion of the gas/liquid mixture, to flow from said vent opening of said oil storage tank through said passageway and into said means of separating during said removal of the gas/liquid mixture from said well head and discharging of the gas/liquid mixture into said oil storage tank.

2. The unit of claim 1 wherein the means for dissipating the kinetic energy further comprise an aggregation of fragmented material.

3. The unit of claim 1 wherein the means for changing the direction of the flow further comprise means for radially redirecting the flow of the gas/liquid mixture flowing through said passageway.

4. The unit of claim 3 wherein said vane means are secured to and above said means for radially redirecting the flow.

5. The unit of claim 4 wherein said means for radially redirecting the flow comprise plate means.

6. The unit of claim 5 wherein said plate means is arched such that a lower concave surface thereof forms a surface for radially redirecting the flow through said passageway, said vane means being secured to an upper convex surface of said plate means.

7. The unit of claim 2 wherein said aggregation of fragmented material is situated above said means for changing the direction of flow in said cavity.

8. The unit of claim 7 wherein said aggregation of fragmented material comprises pieces of stainless steel or molded steel.

9. The unit of claim 8 wherein said aggregation of fragmented material is held in position in said cavity by upper and lower grating means.

10. A separator assembly comprising:

a liquid storage tank having an inlet opening and a vent opening; and means attachable to said vent opening of said liquid storage tank for separating liquid portions from said gaseous portions of a gas/liquid mixture sufficiently pressurized to spontaneously expel under pressure from said vent opening of said liquid storage tank into said means for separating during filling of said liquid storage tank through said inlet opening with said gas/liquid mixture, said means for separating comprising:

means for dissipating the kinetic energy of the gas/liquid mixture expelled from said liquid storage tank in order to separate said liquid portions from said gaseous portions, said means for dissipating comprising vane means for changing the direction of flow of the gas/liquid mixture after the mixture has entered said separator means and an aggregation of fragmented material for receiving redirected flow of said gas/liquid mixture from said vane means; and means for venting the gaseous portions of said gas/liquid mixture.

* * * * *